United States Patent
Bauer et al.

[11] Patent Number: 6,021,707
[45] Date of Patent: Feb. 8, 2000

[54] SAFETY MEANS FOR TILTING KETTLE

[76] Inventors: William A. Bauer, 4746 N. Linder, Chicago, Ill. 60630; Marino D. Floreani, 106 N. Prospect Rd., Park Ridge, Ill. 60068

[21] Appl. No.: 09/067,480

[22] Filed: Apr. 27, 1998

[51] Int. Cl.⁷ .......................... A47J 27/000; B65G 3/004; B65G 65/023

[52] U.S. Cl. ............................... 99/337; 414/421

[58] Field of Search .................. 99/326, 327, 328, 99/329, 330, 331, 332, 333, 334, 337, 338, 348, 426, 427, 403, 404, 405, 406, 407, 408, 409, 410, 485, 486, 492; 366/47, 185; 414/406, 408, 419, 420, 421

[56] References Cited

U.S. PATENT DOCUMENTS

| | | | |
|---|---|---|---|
| 2,251,903 | 8/1941 | Anstice et al. | 366/185 |
| 3,717,329 | 2/1973 | Margittai | 366/185 |
| 3,797,377 | 3/1974 | Lotter et al. | 99/407 |
| 3,954,052 | 5/1976 | Vegh et al. | 99/407 |
| 3,964,378 | 6/1976 | Dunkelman | 99/407 X |
| 4,173,925 | 11/1979 | Leon | 99/348 |
| 4,966,514 | 10/1990 | Knapp | 414/408 |
| 5,002,450 | 3/1991 | Naab | 414/420 X |
| 5,069,593 | 12/1991 | Zelinka et al. | 99/408 |
| 5,125,329 | 6/1992 | Tomatis | 99/453 |
| 5,176,069 | 1/1993 | Chen | 99/348 |
| 5,275,092 | 1/1994 | Fauteux | 99/409 X |
| 5,388,953 | 2/1995 | Habicht | 414/420 X |
| 5,626,073 | 5/1997 | Bauer | 99/337 |

*Primary Examiner*—Janice L. Krizek
*Attorney, Agent, or Firm*—Paul H. Gallagher

[57] ABSTRACT

A lift truck having horizontal arms straddling the kettle it is to lift, carry, and tilt. On the outer end of each arm is a tilting unit, one being a drive unit, and on the other an idler unit. These units grip the handles of the kettle. They are symmetrical, but otherwise identical. Each includes a swinging pendant latch, which yields on engaging the kettle handle, and then swings back into latching position. The units in the arms have interengaging elements preventing sliding of the kettle when it is in tilted position. Two sets of proximity switches are included for shutting off the tilting driving motor when the movable parts of the gripping units are not in safe position.

6 Claims, 3 Drawing Sheets

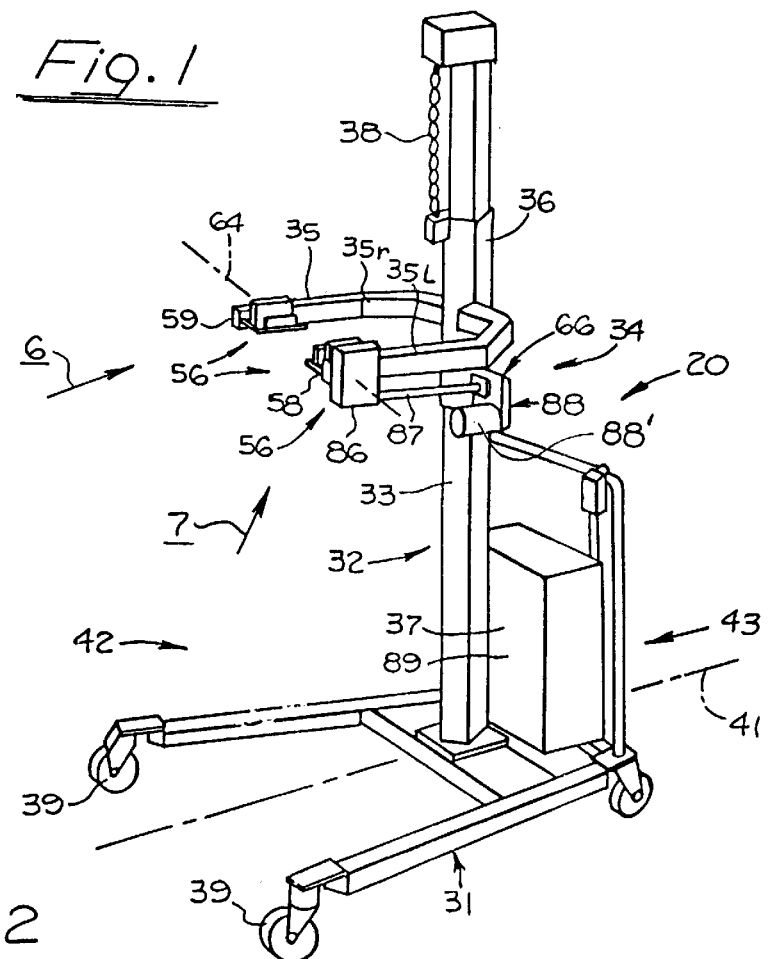
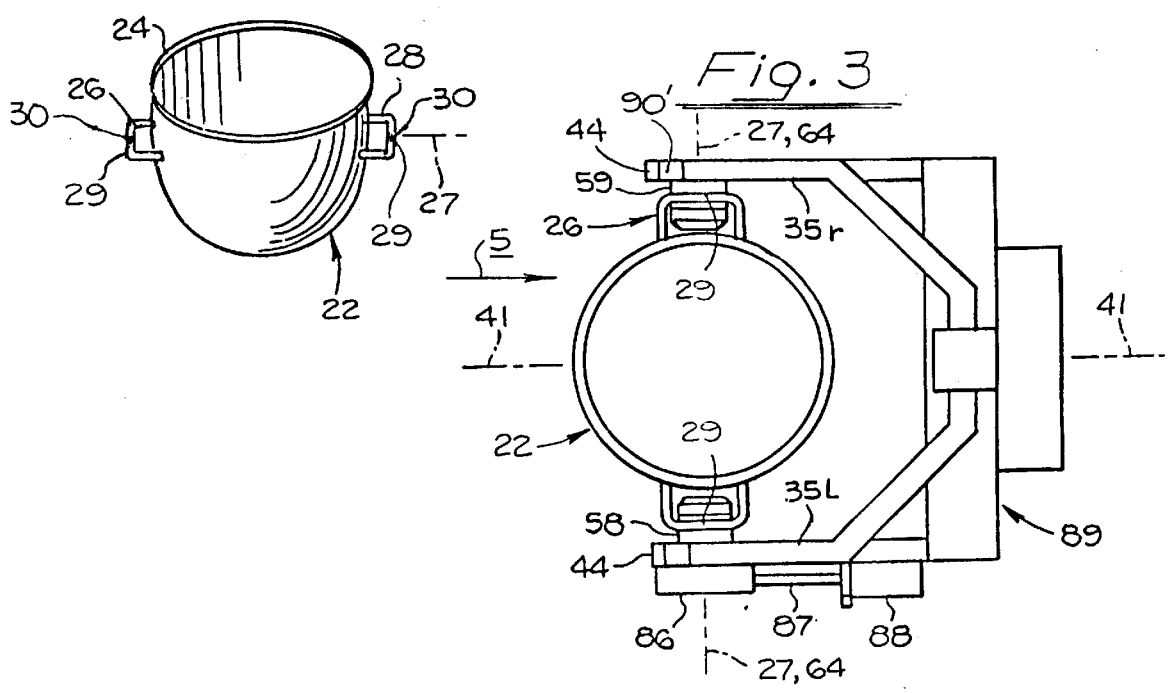

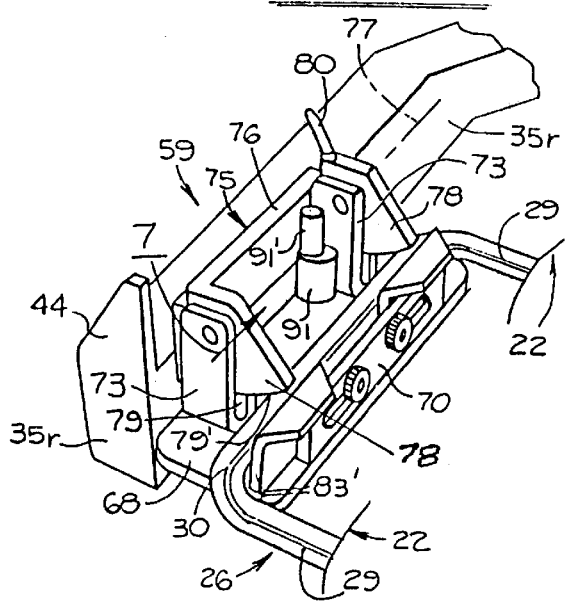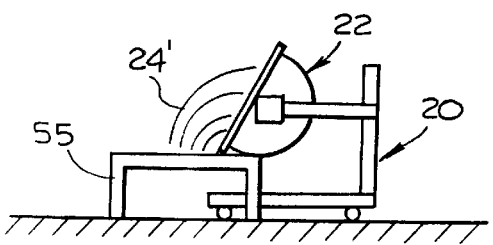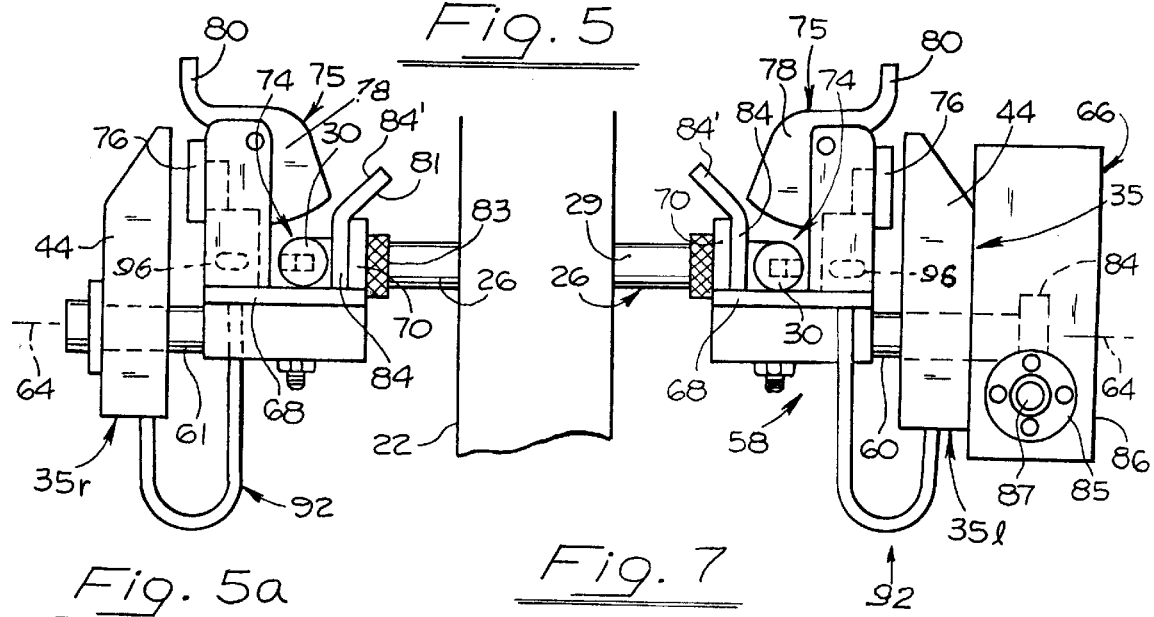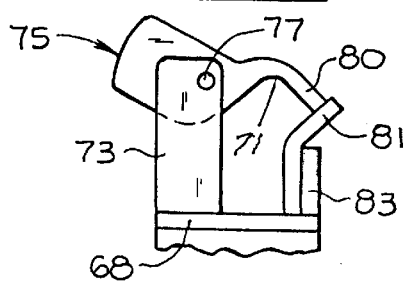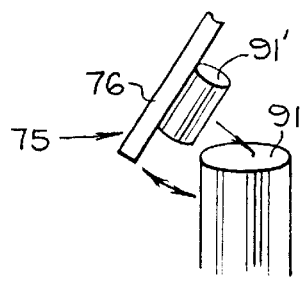

SAFETY MEANS FOR TILTING KETTLE

FIELD OF THE INVENTION

This invention resides in the field of the food processing industry. A principal phase of that field is machines for making candy, as well as for baking and cooking.

In the present case, the invention is directed particularly to machinery for making candy, and for convenience the following disclosure is directed to that specific field, although as stated it is not limited thereto.

In making candy, a kettle is used for mixing it, and the kettle is lifted by a tilting truck and carried to a receiving station where the kettle is tilted and emptied. A power means is incorporated in the tilting truck for tilting the kettle. It is of course necessary, for proper operation, for the kettle to be properly placed in the lifting truck and secured therein. The step of tilting the kettle involves a complicated mechanism to guard against incorrect mounting of the kettle, and securing it.

In such handling of kettles, they are lifted and tilted many times, and the mechanism for gripping it is necessarily complex; these facts increase the probability of improper steps in manipulation of them, and correspondingly great care must be exercised to prevent errors.

A principal object of the invention therefore is to provide safety means for assuring proper mounting and securing the kettle in the tilting truck.

A more particular object, is to provide safety means of the foregoing character that prevents tilting of the kettle by disabling the power means that is used for the tilting step.

A still further object is to provide such safety means that utilizes a magnetic switch means for providing the functions stated.

This invention incorporates certain of the features of U.S. Pat. No. 5,626,073, issued May 6, 1997 to the present William A. Bauer.

BRIEF DESCRIPTIONS OF THE INDIVIDUAL FIGURES OF THE DRAWINGS

FIG. 1 is a perspective view of a tilting truck embodying the features of the present invention.

FIG. 2 is a perspective view of a kettle for which the tilting mechanism is utilized.

FIG. 3 is a top view of the tilting truck with the kettle in place therein.

FIG. 4 is a semi-diagrammatic view showing tilting the kettle for emptying it.

FIG. 5 is a partial view of FIG. 3 as viewed in the direction of the arrow 5 of FIG. 3.

FIG. 5a is a fragmentary, large scale view of a portion of the left hand end of FIG. 5, with an element in release position.

FIG. 6 is a perspective view showing the inner side of a tilting unit on the tilting truck as viewed according to the arrow 6 of FIG. 1.

FIG. 7 is a fragmentary view of certain of the elements of FIG. 6 in an alternate position.

DETAILED DESCRIPTION OF THE DRAWINGS

Figure 8:
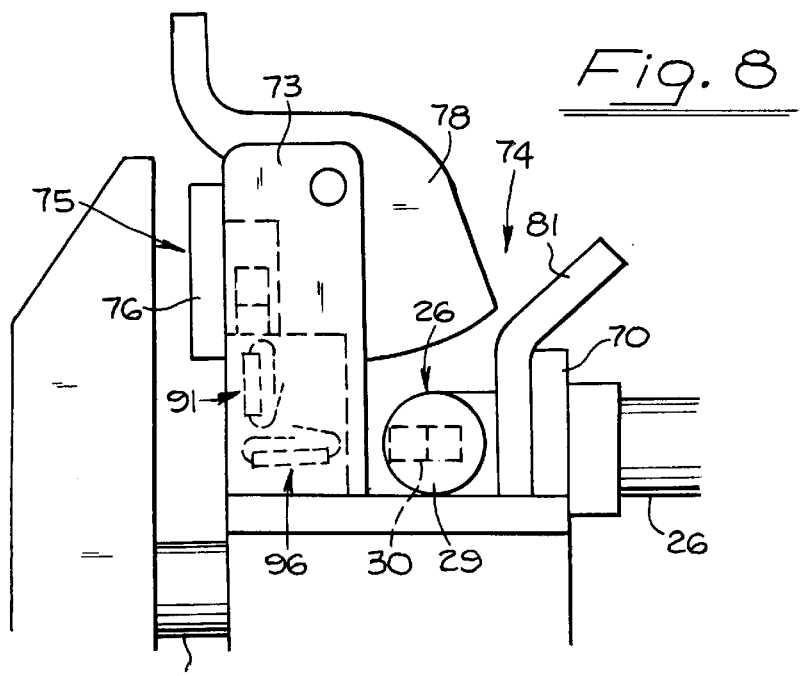
FIG. 8 is a large scale view oriented according to the left hand portion of FIG. 5.

Referring in detail to the drawings, a tilting truck 20 is shown, on which the tilting mechanism is mounted. The tilting truck may also be referred to as a lift truck.

The kettle is shown in perspective at 22 (FIG. 2), which is a known item, heretofore used in the trade, having an open top 24, and handles 26. The content of the kettle is shown at 24' in FIG. 4. The handles are of U shape, or loop form, and are positioned on opposite sides, on a diameter of the kettle, indicated by the axis 27. Each handle includes side elements 28 secured directly to the kettle, and an outer element 29, the elements 29 on the opposite sides being parallel to each other, and perpendicular to the axis 27. These elements 29 will be referred to again specifically in the description of the tilting mechanism.

Incorporated in each element 29 is a magnet 30, for controlling the magnetic proximity switches as described in detail below.

The truck includes a base 31, a column assembly 32 which has a column 33, and a lift fork 34. The lift fork includes arms 35, and a sleeve 36 slidable on the column 33 for providing vertical movements of the lift fork, and hence the kettle. The fork is moved vertically under a control mechanism of known kind, indicated generally at 37, which may include a chain 38 generally in the column, but having an external end (FIG. 1, top) connected to the lift fork. The base 31 includes wheels or casters 39, enabling manual movement of the truck for carrying the kettle to different locations.

The tilting truck 20 is oriented according to a front-to-rear median line 41, indicating a front side 42 and a rear side 43. Thus the arms of the fork extend forwardly, being horizontal, and spaced apart horizontally, with their free outer ends reaching to and slightly past the axis 27 at the center of the kettle (FIG. 3), when the kettle is mounted therein. The arms have upstanding lugs 44 (FIGS. 5–6) at their free ends forming limit stops in the tilting action, as referred to hereinbelow. The various parts of the truck are referred to as right and left as oriented according to the view of an operator at the rear of the truck. The arms are correspondingly identified 35l and 35r for left and right, respectively.

FIG. 4 shows the tilting truck in the step of tilting the kettle. The kettle is mounted on the arms 35 as described in detail hereinbelow, and it is carried to a table 55, and tilted, for emptying the contents 24' from the kettle onto the table.

Reference is next made to the tilting mechanism itself. The tilting mechanism is indicated in its entirety at 56 (FIG. 1) and includes a pair of tilting units 58, 59, mounted on the free ends of the arms 35, having a length direction longitudinally of the arms. The unit 58, mounted on the left arm 35l, is a drive unit, for producing the turning movement of the kettle in the tilting step, while the unit 59, mounted on the right arm 35r, is an idler unit. These units are symmetrical, but otherwise nearly identical.

These two units 58, 59 include stub shafts 60, 61, FIG. 5, by which they are mounted directly on the arms 35, the stub shafts extending through the arms. The stub shafts are rigidly secured to the under sides of base plates 68 of the units, the stub shafts being rotatable in the arms. They are so mounted in coaxial position, on an axis 64 (FIGS. 1, 3, 5), which, when the kettle is held in position by the arms, is parallel to the axis 27 (FIG. 2) of the kettle, and may be but not necessarily coincident therewith. The tilting units 58, 59, rotate or rock about the transverse axis 64 in the tilting step.

The tilting units 58, 59 and the arms 35 for convenience are referred to as having radially inner sides, directed toward the kettle, and radially outer sides directed oppositely therefrom.

The means for driving the drive tilting unit 58 is a unit referred to generally at 66 (FIG. 1) and will be referred to again hereinbelow.

In the detailed description of the tilting units 58, 59, reference is first made to the drive tilting unit 58 (FIG. 3). Each unit includes the base plate 68 with an upstanding wall element 70 (FIGS. 5, 6, 8) at its inner side.

At the outer side of the unit, are two pairs of spaced, vertical lugs or supports 73 (FIG. 6), the pairs being also spaced apart longitudinally. Between the wall element 70 and the vertical lugs 73 (FIG. 5) is a longitudinally extending space 74 for receiving the outer element 29 of the kettle handle, as explained further hereinbelow.

A double tab latch member 75 (FIG. 6) is pivotally swingable in the vertical lugs 73 on a longitudinal axis 77 (FIG. 6), also referred to as a third axis. This member includes a longitudinal back plate 76 and transverse latching tabs 78 positioned in the spaces 79 between the spaced vertical lugs 73. The latching tabs 78 have curved under surfaces 79'. An upstanding pin 80 is provided on the latch member for manually swinging it, and for functioning as a stop means.

The latch member 75 is free rocking, and in the normal use thereof, it is moved by gravity to its latching position shown in FIGS. 5 and 6.

For the purpose of tilting the kettle, the stub shaft 60 at the right (FIG. 5) is provided with a gear 84 for connection with driving means 85 in a gear box 86 mounted on the outer surface of the arm 35*l* and having a drive element in operable connection with the gear. This drive means includes a shaft 87 (FIG. 1) leading to a unit 88 having an electric drive motor 88' (see also FIG. 9) for driving the gear means and thus, through the shaft, rotating and tilting the kettle. The unit 88 provides a safety feature being operable upon excessive rise in motor current to cause a circuit interrupter to actuate, this component being of known kind.

In the practical operation of the tilting truck, and tilting mechanism, an example of a position and setting is assumed as represented in FIGS. 3–5. In this case the units 58, 59 on the extended ends of the arms are placed under the handles 26 of the kettle, and the fork 34 is raised, lifting the kettle. In this step, in the actual lifting of the kettle, the units 58, 59 move up, and the elements 29 of the handles of the kettle move, relatively speaking, downwardly into the spaces 74. In FIG. 3, the details of the latching elements of the tilting units 58, 59 are omitted, for convenience, the tilting units thereby appearing simply as hooks, facilitating the showing of their function.

In a continuation of this movement, the latching step of the tilting units 58, 59 takes place; specifically the elements 29 of the handles engage the latching tabs 78 (FIGS. 5–6), rotating them and thus the latch members 75, in corresponding opposite directions; in FIG. 6 that direction is clockwise, the elements 29 continuing until they engage the base plates 68, after which the latch members 75 rock in the opposite direction, under the action of gravity (FIG. 7). In this step, each back plate 76 engages the vertical lugs 73, the latter thus forming a limit stop. The handles of the kettle are thus held down by the latch members; any upward movement of the handle, and engagement with the latch tabs tends to rotate the latch member about the axis 79 in the opposite direction, but such rotation is prohibited by the engagement of the back plate with the vertical lugs 73.

With the kettle so positioned, i.e., with the handles gripped in the tilting units, the drive force for tilting is then established. In this step, through the action of the drive motor 88' in the unit 88 (FIG. 1), and gear 84, the drive unit 58 is positively rotated about the axis 64 of the stub shafts 60, 61 (FIGS. 1, 3). Thereupon the kettle is tilted on that axis, and it produces a corresponding tilting or rotating movement of the idler unit 59.

In this tilting movement, the weight of the kettle and the contents thereof hold the handles in position in the tilting units, but as the tilting is increased, the kettle tends to slide along the tilting units, i.e., forwardly along the length of the outer elements 29 of the handles, but this movement is checked or limited by the corresponding plates 81. Upon still further tilting movement, the result is an upward movement of the corresponding end of the handle, in such direction as would throw it out of the tilting units, but the latching tabs 78 are engaged by the handle, and the kettle is held against so falling out.

After the tilting step is performed, and the kettle is emptied (FIG. 4) and returned to its upright or normal position, the next step may be to remove the kettle from the tilting truck. To release the handles of the kettle for this purpose, the latch members 75 are manually swung to the opposite or release position, represented in FIG. 5*a*. This latter figure shows only the one shown in the left hand side in FIG. 5, but the one at the other side is in the corresponding position. To do this, the operator grips the pins 80 and throws the members inwardly until the pins engage the slide plates 81 (FIG. 5*a*). The latch members are held in this position by gravity, and in this position they are free of locking effect; as the handles of the kettle are raised (FIG. 5*a*) they engage the latching elements at points 71, and swing them in the opposite direction, i.e., counterclockwise in FIG. 5*a*.

If the latch members 75 (FIG. 5) should unintentionally or accidentally be left in open position, and an attempt be made to tilt the kettle, the latch member 75 is so shaped and constructed that it would engage the safety lug 44 (FIG. 3) on the arm 35*l* at point 90', and the driving force of the motor 88' thereby obstructed by the lug 44 as referred to above. The operator may then manually swing the members 75 back to the proper position. The stoppage would occur if the latch members were not in full open position, but accidentally caught in a partially open position.

To provide greater safety, means is provided for preventing operation of the tilting drive motor if the handles of the kettle are not in proper position in the arms of the tilting truck. In the continual operation of the apparatus the operator manually manipulates the latch members 75 many times, and there is likelihood of the handles of the kettle not being properly placed in position. To guard against such mistakes, magnetic proximity switches are utilized, in the operation of which elements of the latching means and handles take part.

Figure 9:
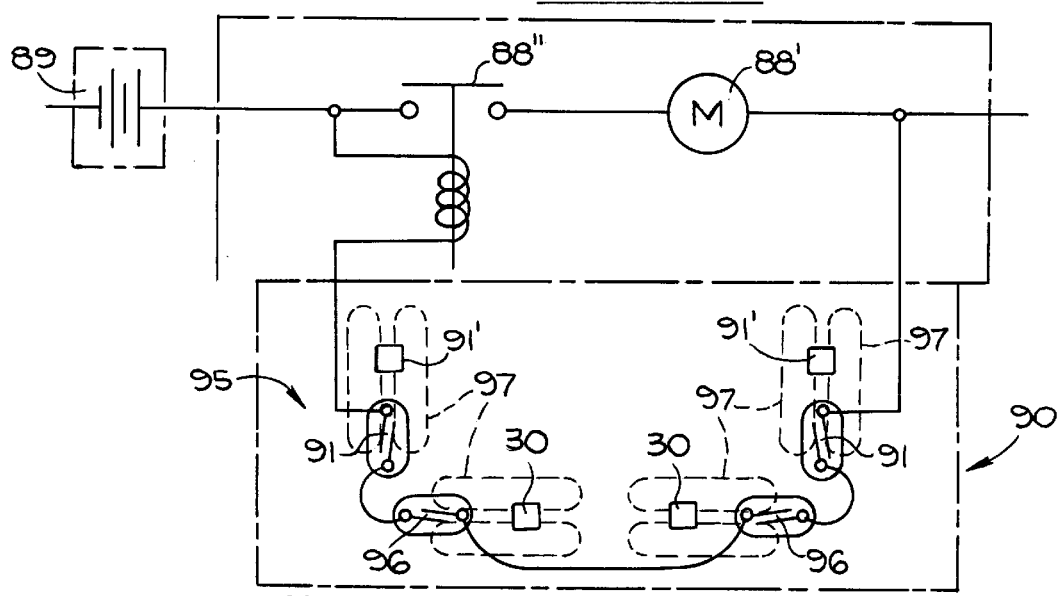
FIG. 9 is a diagrammatic view of magnetic proximity switches and corresponding circuit.

Attention is directed to FIG. 9 which shows the drive motor 88' identified above, controlled by a normally open switch 88" and driven by a battery 89. This figure also includes a control circuit 90 including the magnetic proximity switches and magnets, mounted on the elements of the apparatus and kettle.

A first phase of the magnetic control involves the latch members 75. A magnetic proximity switch 91 is mounted in each of the units 58, 59 shown best in FIG. 6, but also in FIG. 5. The switch is mounted on and perpendicular to the plate 68. Mounted on the back plate 76 is a magnet 91', and when the latch member 75 is in locking position (FIG. 6), the magnet is in proximity to the end of the switch, and a cable 92 (FIG. 5) leads to the control unit 88. The magnet establishes a magnetic field 97 (FIG. 9), closing the switch to the drive motor. When the magnet is moved out of that position (FIG. 7), by moving the member 75, the magnetic field is destroyed and the circuit opened to the drive motor. Accordingly, the drive motor can operate only when the latch member 75 is in proper locking position (FIGS. 5, 6, and 8).

The two switches 91 on the two sides of the kettle are in series with two other similar switches, all of which are arranged in a series in a common circuit, and all must be closed, to close the normally open switch 88", as described above.

A second phase of the magnetic control involves the magnets 30 (FIGS. 2, 5, 8) embedded in the handles of the kettle. In each unit 58, 59 (FIGS. 5, 8, 9) is a second magnetic proximity switch 96, and the two switches are shown in FIG. 8. These switches are in fixed position in the units 58, 59, and when the handles of the kettle are properly mounted, the magnets therein register with the switches, and in this case also, the respective switches are closed, and as indicated, the circuit is closed to the drive motor 88'. Thus when any of these switches are open, the drive motor is disabled.

Figure 10:
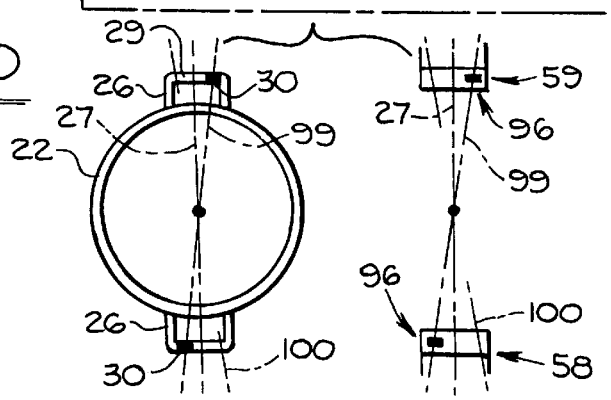
FIG. 10 is a fragmentary, exploded view showing relationship between the kettle handles and lift fork elements.

Reference is made to FIG. 10 showing the kettle 22, and the principal elements of the units 58, 59, which are displaced from operable position of holding the kettle. The magnets 30 in the handles are preferably both located on a common diameter of the kettle. The outer elements 29 of the handles are perpendicular to, and symmetrical to, the common axis 27 of the kettle. These elements are relatively long, and the magnets 30 therein, are located at the respective ends of the handle elements 29 on another common axis 99 (FIG. 10). The related switches 96 are located on the same axis, and thus on the corresponding front/rear ends of the units 58, 59, the advantage of this being that the kettle can be randomly positioned about the central vertical axis, for use.

The magnets/switches can be selectively located on the axis 100 instead, if desired.

The magnetic proximity switches are of known kind, and they function as represented in FIG. 9, i.e., the fields 97 of the magnets effect closure of the switches.

As a matter of background concerning the mounting of these magnetic switches and the magnets, it is pointed out that there are times in the handling of the kettle the latch members 75 are not in latching position, due to any of various faults, such as temporary sticking, or due to human error, or other mistake, and in such case, the handles of the kettle would not be securely held by the latch elements. Obviously if the tilting units 58, 59 were actuated without the handles being securely held, the kettle could fall out of position in the attempted tilting step.

We claim:

1. Safety means for use in an apparatus,
for mounting and manipulating a kettle for use with food products,
the kettle having handles on diametrically opposite sides,
the apparatus having arms for receiving the kettle and with means for gripping the handles of the kettle,
the apparatus including drive means for tilting the kettle when the kettle is gripped by the gripping means,
the safety means comprising,
magnets in the handles of the kettle, and
circuit means connected to the drive means and having an element in the gripping means, and being normally open, and the driving means thereby being normally disabled, and
the magnets being operable when the kettle is properly gripped by the gripping means for energizing the circuit means and enabling the drive means.

2. Safety means according to claim 1 wherein,
the arms are a pair on opposite sides of and parallel to a center line extending from rear to front of the apparatus, and the arms extend forwardly,
the gripping means are on the front ends of the arms,
the gripping means have latch members swingable into and out of a securing position,
each gripping means has a magnetic proximity switch in fixed position thereon,
each latch member has a magnet thereon which is in magnetic control position when the latch members are in said securing position,
all of said switches being in series in said circuit means.

3. Safety means according to claim 1 wherein,
the gripping means has a magnetic proximity switch in fixed position relative to the corresponding arm,
said magnetic proximity switch being in said circuit means and being normally open, and
the magnet being in operative alignment with the magnetic proximity switch when the kettle is properly gripped by the gripping means.

4. Safety means according to claim 3 wherein,
a magnet is mounted in each of the handles of the kettle,
a magnetic proximity switch is so mounted in each of the gripping means,
the magnetic proximity switches are both in series in the circuit means, and
the magnets are in such operative alignment.

5. Safety means according to claim 4 wherein,
the handles have substantial length in direction perpendicular to a diameter of the kettle about which each handle is symmetrical, and
the magnets are on a common diameter of the kettle.

6. Safety means for use in apparatus having a removable kettle to be tilted and a normally inactive electrically controlled motor for tilting the kettle,
the kettle having handles and a determined safe position in the apparatus,
the safety means comprising,
magnet means in the handles of the kettle, and
means responsive to the magnet means, when the kettle is in its safe position, operable for activating said motor and thereby tilting the kettle.

* * * * *